Jan. 31, 1933.    J. H. HAMMOND, JR    1,895,924
ELECTRICAL CONTROL SYSTEM
Filed May 23, 1929    3 Sheets-Sheet 1
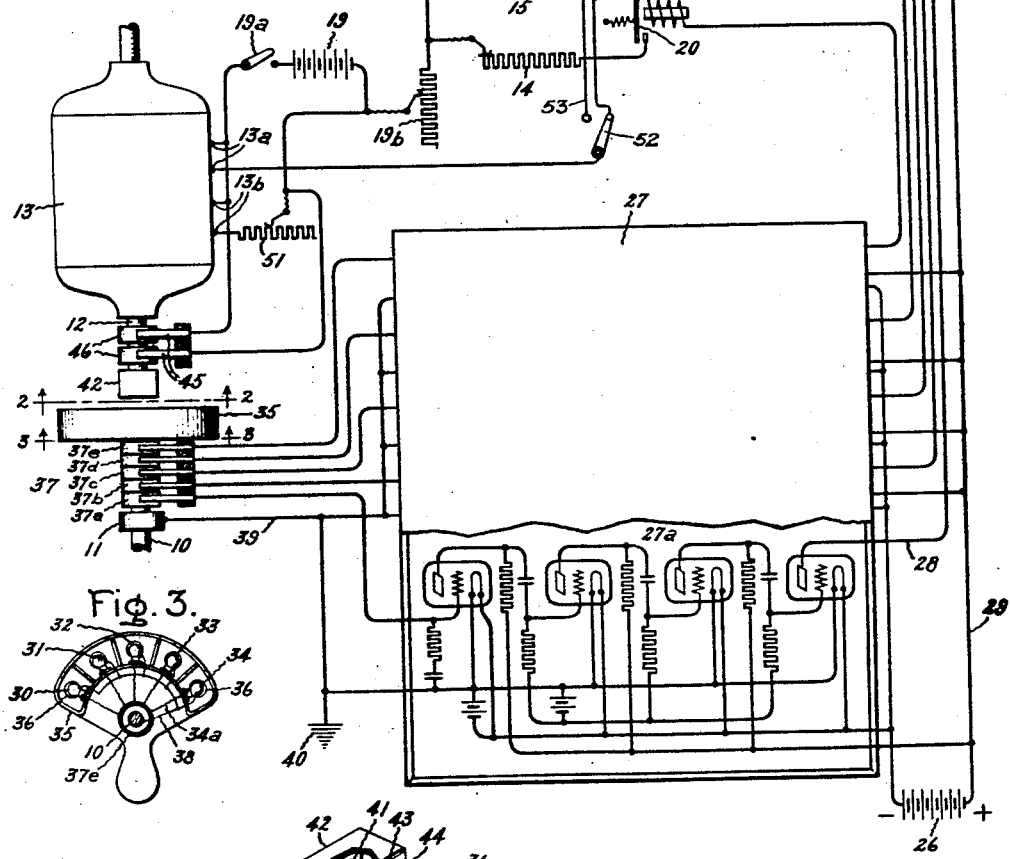
Inventor:
John H. Hammond Jr.,
by Charles E. Mullen
His Attorney.

Jan. 31, 1933.   J. H. HAMMOND, JR   1,895,924
ELECTRICAL CONTROL SYSTEM
Filed May 23, 1929   3 Sheets-Sheet 2

Inventor:
John H. Hammond Jr.,
by Charles E. Mullen
His Attorney.

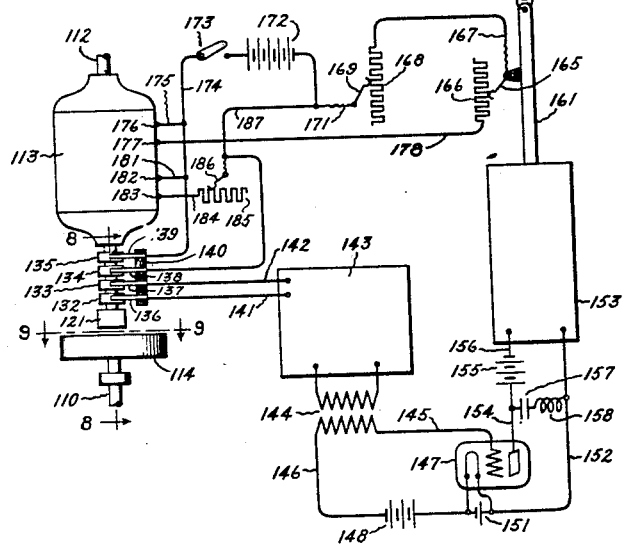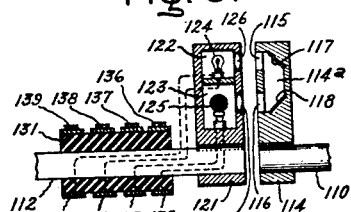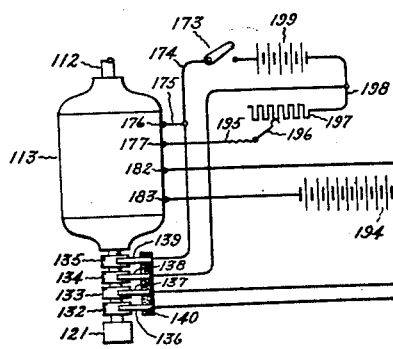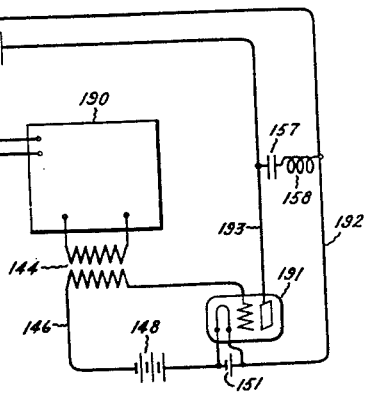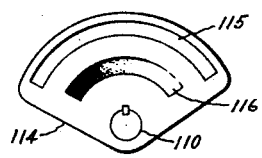

Patented Jan. 31, 1933

1,895,924

UNITED STATES PATENT OFFICE

JOHN HAYS HAMMOND, JR., OF GLOUCESTER, MASSACHUSETTS, ASSIGNOR TO GENERAL ELECTRIC COMPANY, A CORPORATION OF NEW YORK

ELECTRICAL CONTROL SYSTEM

Application filed May 23, 1929. Serial No. 365,425.

My invention relates to electrical control systems, more particularly to electrical control systems for rotating members, and has for an object the provision of improved means for controlling the relative speed of said members.

Although my invention is not limited thereto, it has particular application in connection with synchronizing systems for a pair of rotating members which are located adjacent each other.

In accordance with my invention, I provide speed regulating means for one of the rotating members and control the speed regulating means so that a synchronous speed condition will be maintained between the members. I conveniently control the speed regulating means by means of a suitable light-sensitive device, which is activated responsively to the movement of the rotating members.

Figure 5:
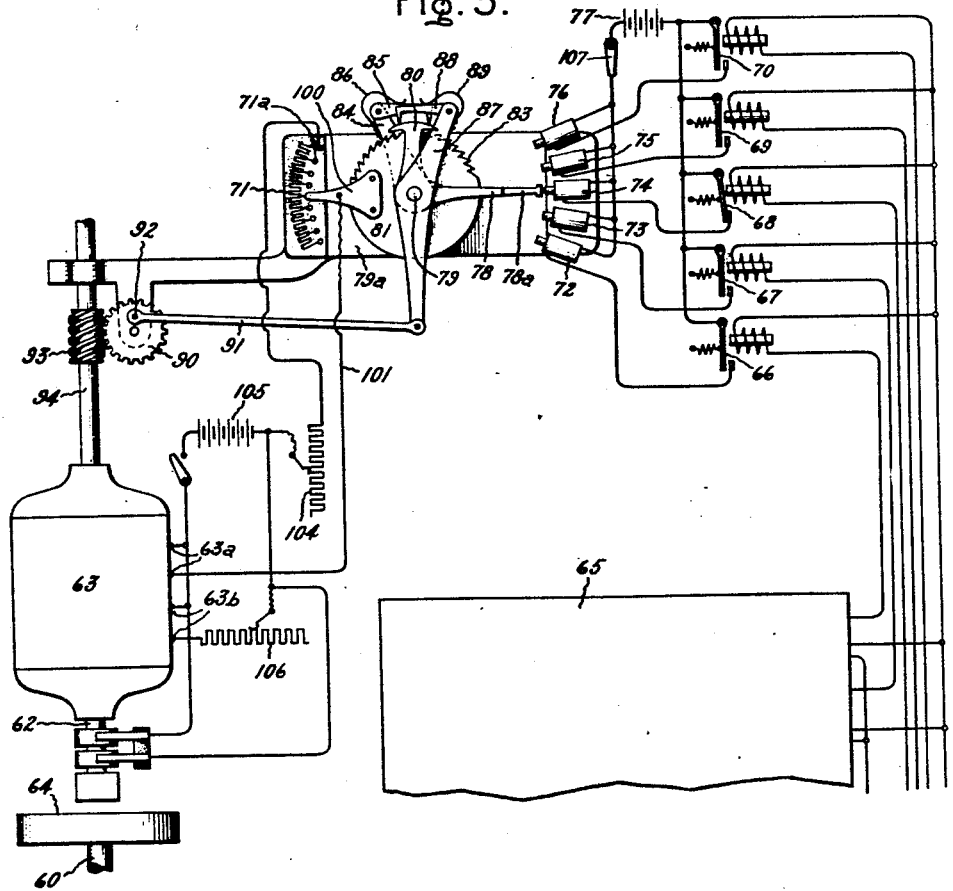
Figure 6:
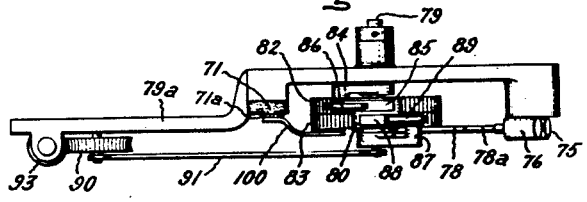

For a more complete understanding of my invention, reference should be had to the accompanying drawings in which Fig. 1 is a diagrammatic view of a synchronizing system embodying my invention; Fig. 2 is an elevation taken on the line 2—2 of Fig. 1; Fig. 3 is an elevation partly in section taken on the line 3—3 of Fig. 1; Fig. 4 is a perspective of a portion of the mechanism used in my system, with portions broken away to illustrate certain structural details; Fig. 5 is a diagrammatic view of a modified form of my invention; Fig. 6 is an end view of a portion of the mechanism shown in Fig. 5; Fig. 7 is a diagrammatic view of another modified form of my invention; Fig. 8 is a section taken on the line 8—8 of Fig. 7; Fig. 9 is an elevation taken on the line 9—9 of Fig. 7; and Fig. 10 is a diagrammatic view of still another modified form of my invention.

Referring to the drawings, I have shown my invention in one form in connection with a pair of rotatable shafts located adjacent each other. As shown (Figs. 1 to 4 inclusive), a shaft 10, mounted in a supporting bearing 11, is positioned adjacent a shaft 12. The rotatable shaft 10 will be actuated in any suitable manner while the rotatable shaft 12 will be actuated by means of an electric motor 13 which is shown to be directly connected mechanically with the shaft. The motor 13 is provided with armature terminals 13a and field terminals 13b.

In order to cause the shafts 10 and 12 to rotate in synchronism, I control the speed of the motor 13 responsively to the motion of the shafts. To this end, I provide suitable speed regulating means for the motor which will be controlled responsively to the motion of the shafts by means of a suitable light responsive means. As shown, the motor will be provided with a plurality of variable resistances 14, 15, 16, 17 and 18, each one of which may be connected with the motor armature circuit in series with a suitable electrical supply source 19, shown as a battery, and a suitable controlling resistance 19b. A suitable control switch 19a is inserted on the armature circuit of the motor.

It will be observed that these resistances are adjusted to varying degrees by reason of which the speed of the motor may be controlled conveniently by inserting one or the other of these resistances in the armature circuit. These resistances are provided with suitable controlling relays 20, 21, 22, 23, and 24, respectively, each one of which when closed will insert its associated resistance in the motor armature circuit.

In order to control the speed regulating resistances responsively to the motion of the shafts 10 and 12, I provide a plurality of light sensitive means for controlling the operation of their controlling relays. As shown, each relay is connected with a source of electrical supply 26, shown as a battery, through the appropriate unit of an amplifier 27, which unit will be controlled by a photo-electric cell. It will be understood that the amplifier 27 comprises five units, one being provided for each of the resistance controlling relays. Preferably these amplifying units will be of the thermionic character.

Only one 27a of these amplifying units, that for the relay 24, is shown. Thus, as shown, one side of the output of the amplifying unit 27a is connected through the conductor 28, the operating coil of the relay 24 and thence through the conductor 29 to the positive side of the battery 26, while the other side of the output of this amplifying unit is connected directly to the negative side of the battery. Similarly the other units of the amplifier are connected with their respective relays and with the battery.

As shown, five photo-electric cells 30, 31, 32, 33 and 34 (Fig. 3) are provided to control the amplifying units provided for the relays 24, 23, 22, 21, 20, respectively. These photo-electric cells will be activated responsively to the motion of the shafts 10 and 12. As shown, the photo-electric cells are provided with a suitable supporting member 35. The supporting member 35 is provided with a plurality of compartments for housing the photo-electric cells, each compartment being provided to house one of the photo-electric cells. The supporting member 35 is rigidly mounted upon the shaft 10 adjacent its end so that as the shaft is rotated the member 35 together with the photo-electric cells will be rotated with it. As shown, each compartment is provided with a circular aperture 36 for receiving the rays from the activating source of light.

Each photo-electric cell will be suitably electrically connected with its amplifying unit. As shown, one side of each photo-electric cell is electrically connected to a corresponding segment of a commutator 37 mounted on the shaft 10. The commutator 37 comprises five sections, 37a, 37b, 37c, 37d and 37e for the photo-electric cells 30, 31, 32, 33, and 34, respectively. Thus, for example, the photo-electric cell 34 is connected by means of a conductor 34a with its commutator segment 37e. Each of these brushes is connected with the corresponding amplifying unit as will be clearly seen by reference to Fig. 1. The other sides of the photo-electric cells are electrically connected by a common conductor 38 through the shaft 10 to the bearing 11 which in turn is electrically connected by a conductor 39 to the units of the amplifier 27. The bearing 11 also is grounded as indicated by the numeral 40.

Thus, it will be observed (Fig. 1) that each photo-electric cell is connected across the input circuit of its associated amplifier unit in such manner that when the photo-electric cell is activated, the resulting photo-electric current produced by the activation of the cell will be amplified by the thermionic unit, this amplified current then being transmitted to actuate the associated relay. It will also be observed that the motor will be caused to operate at a speed which will depend upon the particular photo-electric cell that is activated.

As stated before, the photo-electric cells will be activated responsively to the movement of the shafts. To this end, I provide a source of light 41, shown as an incandescent lamp, which will be caused to be rotated in synchronism with the shaft 12 and will be positioned so that its path of movement will be adjacent that of the photo-electric cells. Thus as shown, the lamp 41 will be provided with a supporting member 42 rigidly positioned upon the shaft 12 adjacent its end. The lamp will be mounted within a compartment 42a (Fig. 4) which will be provided with a circular aperture 43 through which the rays of light from the lamp may be projected. A lens 44 is mounted within this aperture and is so adjusted that when a photo-electric cell is directly in line with the source of light, the rays will be focused upon the cell. The lamp 41 will be provided with a suitable source of electrical supply. Thus, the lamp may be conveniently supplied from the battery 19 by means of brushes 45 and slip rings 46. It will be observed that the battery 19 is also connected across the field terminals 13b of the motor 13 through a suitable variable resistance 51.

In the operation of this form of the invention, the shaft 10 will be rotated at some predetermined speed and the motor 13 will be started and brought up to the same speed by properly adjusting the controlling resistances 19b and 51. It will be understood that in starting, the motor 13 will not be energized responsively to the automatic operation of the relays 20 to 24, inclusive. To render these relays ineffective, I complete the armature circuit in starting through the switch 52. Thus, this switch will be moved from its normal operative position, shown in Fig. 1 to a position to close the armature circuit through the conductor 53. When the motor approaches synchronous speed in response to the operation of the resistances 19b and 51, one relay after another will close until finally the relay 22 will remain closed. The two shafts 10 and 12 are then rotating in synchronism. The switch 52 is then thrown to its normal operative position (Fig. 1) so as to effect the automatic control of the shaft 10. Thus, when the shaft 12 has thus been brought into synchronism with the shaft 10, the lamp 41 will be positioned opposite the middle photo-electric cell, i. e., the cell designated by the number 32, as indicated by the closed contactor 22. The resistances 19b and 51 are left in their adjusted positions. Should the motor slow down slightly so that the lamp 41 will move from its position opposite the photo-electric cell 32 to a position opposite the next photo-electric cell 31 to the left, as viewed in Fig. 3, supposing that the cells are being rotated in a clockwise direction, the cell 31 will be activated and the current from it amplified by the corresponding unit of the amplifier 27. As a result of this operation, the relay 23 will be energized while the relay 22 will be deenergized. It will be observed, therefore, that the lower resistance 17 will be inserted in the motor armature circuit and in consequence the motor will be speeded up until the lamp 41 will again be positioned opposite the central photo-electric cell 32 at which position the relay 22 again will be energized while the relay 23 will have been deenergized. If the motor should speed up, the photo-electric cell 33 to the right of the cell 32 will be energized, thus causing the relay 21 to close to insert the larger resistance 15 in the motor armature circuit. As a result of this operation, the motor will be caused to slow down. Obviously, the same results will be obtained by variation in the speed of the shaft 10. It will be understood that the number of resistance steps together with their controlling relays and photo-electric cells may be increased or decreased to meet the requirements of a particular system.

It will be observed that the particular resistance which is inserted in the motor armature circuit will depend upon the magnitude of the angular displacement between the shafts 10 and 12. Thus, the magnitude of the resistance which is inserted will always be such that the more the shafts are out of synchronism, the quicker they will be brought into phase.

In the modified form of the invention shown in Figs. 5 and 6, the shaft 60, the shaft 62, the motor 63, correspond with the shaft 10, the shaft 12 and the motor 13, respectively of Fig. 1. The shafts 60 and 62 and the motor 63 together with the light-responsive mechanism 64 and the amplifier 65 all are of the identical construction and all are operably arranged in identically the same manner as the corresponding parts of the system shown in Figs. 1 to 4 inclusive. The photo-electric cells of the light-responsive mechanism 64 will control appropriate units of an amplifier 65 and these in turn will control the relays 66, 67, 68, 69 and 70 as has been previously described in connection with the operation of the relays 20 to 24 inclusive. These relays, however, in the modified form will control a single resistance element 71 which will be included in the motor armature circuit. Thus, these relays will control the energizing circuits for an equal number of electromagnets 72, 73, 74, 75, and 76, respectively, the energy for these electromagnets being supplied from a suitable electric supply source shown as a battery 77.

Located adjacent these electromagnets is a bell crank 78, the ends 78a of which will be formed of some suitable magnetic material. The bell crank 78 is rotatably mounted upon a shaft 79 which in turn is rotatably mounted in a frame 79a. The other end of the bell crank 78 is provided with a T-shaped head 80 which projects over the teeth of a double ratchet wheel 81, this wheel being free to rotate upon the shaft 79. The ratchet wheel 81 is provided with two rows of teeth 82 and 83 which point in opposite directions. Rigidly secured to the shaft 79 is an arm 84 to the upper end of which is pivoted a pawl 85. This pawl is pressed downwardly by means of a spring 86. A second arm 87 is rigidly secured to the shaft 79, this arm likewise being provided with a pawl 88 pivoted to its upper end, this pawl being pressed downwardly by means of a spring 89. The pawls 85 and 88 normally rest upon the upper surface of the T-shaped head 80, but as will be observed, if this head is moved toward the left, as viewed in the figure, the pawl 85 will engage the ratchet teeth 82, while if the head is moved toward the right, the pawl 88 will engage the teeth 83.

The lower end of the arm 87 is connected to a worm wheel 90 by means of a link 91. As shown, the link 91 is pivoted at one of its ends to the lower end of the arm 87, while at its other end the link is connected with the worm wheel 90 by means of a pin 92, which is offset from the center of the wheel. As shown, the worm wheel 90 meshes with a worm 93 which is mounted upon a shaft 94. This shaft may be the motor shaft or it may be a shaft suitably mechanically connected to be actuated by the motor shaft.

An arm of conducting material 100 is rigidly secured to but insulated from the double ratchet wheel 81 and is connected by a flexible conductor 101 to one of the armature terminals 63a. The outer end of the arm 100 slides over the resistance contacts 71a provided for the resistance 71. Thus, it will be observed that the conducting arm 100 constitutes a contact arm for adjusting the resistance 71. As shown, this resistance is connected in the armature circuit in series with an adjustable resistance 104 and the electrical supply source 105. As shown, a suitable adjustable resistance 106 is connected across the motor field terminals 63b.

It will be observed that the resistance 71 together with the electromagnets 72, 73, 74, 75 and 76 may be supported conveniently by means of the frame 79a.

In the operation of the modified form of the invention shown in Figs. 5 and 6, the shaft 60 will be rotated in any suitable manner at a predetermined speed and the motor 63 provided to operate the shaft 62 will be brought up to the same speed by adjusting the resistances 104 and 106 provided in its field and armature circuits, respectively. As before, the motor, while being started, will be manually controlled. Thus, the switch 107 will be in its open position during the starting period. It will be understood that the resistance arm 100 will occupy its central position (Fig. 5) during the starting period. Moreover, as before, the lamp carried by the shaft 62, preferably, will be positioned when the shafts are in synchronism opposite the middle photo-electric cell as indicated by the closed relay 68 (Fig. 5). Thus, when the relay 68 remains closed, it will be known that the shafts are rotating in synchronism. The switch 107 will then be closed, thus allowing automatic speed control of the motor.

It will be observed that since the relay 68 is closed, the electromagnet 74 associated therewith will be energized and the arm 78 will be positioned opposite this electromagnet, as shown in Fig. 5. As the shaft 94 is rotated by the motor, the worm wheel 90 will be rotated through the medium of the worm 93 at a lower speed than that of the shaft 94. The rotation of the worm wheel imparts a reciprocating motion to the link 91 which in turn imparts an oscillating motion to the arm 87. The pawls 85 and 88, therefore, will be moved back and forth across the T-shaped head 80. Normally this motion, however, will not be sufficient to permit either of the pawls to engage the ratchet teeth provided on the ratchet wheel 81.

If the motor should slow down to such an extent that the relay 69 be energized, as has been described in connection with the operation of the system shown in Figs. 1 to 4 inclusive, an energizing circuit for the electromagnet 75 will be completed. As a result of this energization of the magnet 75, the arm 78 will be rotated through a small angle in a counter-clockwise direction to a position opposite this magnet. This operation permits the pawl 85 to engage one of the teeth 82 when the arm 84 is moved in a clockwise direction. It will be observed that when the pawl 85 engages one of these teeth 82, the ratchet wheel 81 will be rotated in a clockwise direction through the distance of one tooth. As a result, the resistance contact arm 100 will be moved in a clockwise direction so as to slightly decrease the resistance of the motor armature circuit. This will cause the motor to speed up so as to again bring the activating lamp opposite the photo-electric cell which is connected to energize the central electromagnet 74. This electromagnet, therefore, will be energized while the electromagnet 75 will have been deenergized. This operation will cause the arm 78 to return to its central position, i. e., the position shown in Fig. 5 so that the pawl 85 will no longer engage the teeth 82.

It will be observed that the contact arm 100 will be left in the position to which it was moved by operation of the electromagnet 75 so that a slightly greater armature current will be supplied to the motor by reason of which any slight increase in load which may occur will be accommodated. If, however, this increase in current is not sufficient to bring the shaft 62 back into synchronism with the shaft 60, the arm 78 will remain in its displaced position, i. e., the position opposite the magnet 75, for a longer period of time thus permitting the pawl 85 to move the ratchet wheel 81 in steps through a distance of several teeth. It will be observed that in this way, if the motor is slowed down for any reason, the resistance 71 will be gradually decreased in steps until the shaft 62 is brought back into synchronism, under which condition of operation the arm 100 will be left in its final adjusted position.

If the motor should be thrown out of synchronism sufficiently to cause the relay 70 to close so as to energize its associated magnet 76, the arm 78 will be rotated through twice the angle through which it was previously rotated by reason of the energization of the electromagnet 75. This operation will cause the pawl 85 to move the ratchet wheel through the distance of two teeth for each oscillation of the arm 84. This operation will adjust the resistance twice as rapidly and thus cause a more rapid increase in the current supplied in the armature of the motor. The armature, of course, will be speeded up more rapidly in order to bring the shaft 62 back into synchronism in the least possible time. It will be observed, therefore, that the rate at which the resistance 71 is adjusted depends upon the angular displacement between the shafts 60 and 62 so that the more they are out of synchronism the quicker they will be brought back into phase.

If the motor should rotate the shaft 62 slightly faster than the shaft 60 is being rotated, similar but opposite action will take place. Under such circumstances the arm 78 will be moved in a clockwise direction, as viewed in the figure, so as to allow the pawl 88 to engage the teeth 83. This operation will cause the resistance contact arm 100 to be moved in a counter-clockwise direction by reason of which the resistance in the motor armature circuit will be increased and the motor will be slowed down until it again brings the shaft 62 into synchronism with the shaft 60.

In the modified form of my invention shown in Figs. 7, 8 and 9, the shaft 110, the shaft 112 and the motor 113 correspond with the shaft 10, the shaft 12 and the motor 13, respectively, of Fig. 1. Rigidly mounted on the shaft 110 is a sector shaped supporting member 114 which is provided with a compartment 114a having two substantially concentric curved openings 115 and 116. The opening 115 is provided with a transparent cover such as a plain sheet of glass while the opening 116 is provided with a covering or screen of varying transparency. Thus, the opening 116 may be provided with a sheet of glass or other suitable material, that is transparent at one end, shown as the right hand end as viewed in Fig. 9, and opaque at the other end, i. e., the left hand end as viewed in Fig. 9. The portion between the two ends is graded so that the opacity varies in a uniform manner from the transparent end to the opaque end. Mounted within the compartment 114a and back of the opening 115 is a curved mirror 117 positioned substantially at an angle of 45° to the opening, and mounted within the chamber 114a opposite to the opening 116 is a second curved mirror 118 positioned substantially at an angle of 90° to the mirror 117.

A second supporting member 121, which is provided with two compartments 122 and 123, is rigidly secured to the end of the shaft 112 adjacent the supporting member 114. A suitable source of illumination 124, shown as an incandescent lamp, is suitably mounted within the compartment 122 and suitable light sensitive means 125, shown as a photo-electric cell, is mounted within the compartment 123. These compartments are provided with apertures (Fig. 8) directly opposite the openings 115 and 116, respectively, provided in the supporting member 114, and these apertures are provided with lenses 126 and 127, respectively.

Mounted on the shaft 112 is a cylindrical insulating member 131, upon which is mounted three slip rings 132, 133 and 134 and a segmented commutator 135. Four brushes 136, 137, 138 and 139 are provided for engaging the three slip rings and the commutator, respectively. These brushes are mounted upon an insulated support 140. As shown, the photo-electric cell 125 is electrically connected to the two slip rings 132 and 133, while the source of illumination 124 is electrically connected to the slip ring 134 and to the commutator 135. As shown, the brushes 136 and 137 are electrically connected by two conductors 141 and 142, respectively, to an amplifier 143, which is tuned to the same frequency as produced by the commutator 135, which, for example, may be 500 cycles. It will be understood that the amplifier 143 will be of any suitable well-known construction. It is believed unnecessary for a proper understanding of this invention to describe in detail the form and construction of this amplifier.

The output of the amplifier 143 is electrically connected to the primary winding of a transformer 144. One side of the secondary of this transformer is electrically connected by means of a conductor 145 to the grid of a tube 147, while the other side of the secondary is electrically connected by means of a conductor 146 to one side of a battery 148. As shown, the other side of the battery 148 is electrically connected to the filament of the tube 147 and to one side of a battery 151, the other side of which is electrically connected to the other side of the filament, and by means of a conductor 152 to one side of the winding of a solenoid 153. The plate of the tube 147 is connected by means of a conductor 154 to one side of a battery 155, the other side of this battery being connected by means of a conductor 156 to the other side of the solenoid winding. A capacity 157 and an inductance 158 are connected electrically between the conductors 152 and 154.

As shown, one end of the solenoid core 161, i. e., the upper end of the core, is mechanically connected to one end of a tension spring 162, the other end of which is mechanically connected, preferably by a swivel joint, to a thumb screw 163. This thumb screw is threaded into a suitable supporting bracket 164. It will be observed that the tension of the spring 162 may be adjusted conveniently to any desired amount by turning the thumb screw 163. Mounted on but insulated from the core 161, is a suitable brush 165 which is provided to control a suitable adjustable resistance 166. This brush is connected by a flexible conductor 167 to a second adjustable resistance 168, which is provided with an adjustable brush 169. This brush, as shown, is electrically connected by means of a flexible conductor 171 to one side of a battery 172, the other side of which is connected to the brush 139 through a switch 173 and a conductor 174. The conductor 174 is electrically connected by means of a conductor 175 to one of the armature terminals 176, the other armature terminal 177 being electrically connected to the adjustable resistance 166 by means of a conductor 178. The conductor 174 is also connected to one of the field terminals 182 by means of a conductor 181, the other field terminal 183 being electrically connected by means of the conductor 184 to a suitable adjustable resistance 185. As shown, the resistance 185 is provided with an adjustable brush 186, this brush being electrically connected by means of the conductor 187 and the conductor 171 with the brush 169.

In the operation of the modified form of my invention shown in Figs. 7, 8 and 9, the shaft 110 is rotated in any suitable manner at a predetermined speed and the motor 113 is brought up to this speed by adjusting the resistances 168 and 185 in the armature and field circuits respectively.

It will be understood that a pulsating current will be sent through the lamp 124 by reason of the commutator 135 intermittently breaking the circuit from the brush 139. Pulsating light rays, therefore, will be passed through the lens 126, through the transparent glass covering in the opening 115 and then will be deflected from the mirror 117 to the mirror 118, from whence the rays will be passed through the shaded glass in the opening 116 and thence through lens 127, which will focus the rays on the photo-electric cell 125. The current from the photo-electric cell will pass from the slip rings 132 and 133 through the brushes 136 and 137 from which it will be transmitted to the amplifier 143 by means of the conductors 141 and 142. It will be understood, therefore, that this current is amplified, and that the amplified current will be transmitted to the power tube 147, which supplies current to the solenoid 153. It also will be understood that this current will be proportional to the intensity of the light transmitted to the photo-electric cell 125.

Under synchronous operating conditions, the supporting member 121 will be positioned opposite the center of segmental supporting member as shown in Fig. 7. Under these conditions, the tension of the spring 162 will be adjusted by means of the thumb screw 163 so that the brush 165 will be approximately on the center of the resistance 166. With the various parts of the system in their respective positions just described, and shown in Fig. 7, it will be understood that if the shaft 112 should lag behind the shaft 110, the supporting member 121 will be moved relative to the supporting member 114 so that the photo-electric cell 125 will be moved to a position opposite a less opaque part of the glass covering, provided for the opening 116, and as a result a greater amount of light will be transmitted to the photo-electric cell. Obviously, a greater amount of current will be caused to flow through the solenoid 153. This will cause the core 161 to be moved downwardly, as viewed in Fig. 7, against the tension of the spring 162 a distance proportional to the increase of illumination upon the photo-electric cell. As shown, this operation of the solenoid will effect a decrease in the resistance 166 which in turn will effect an increase in the motor armature current. The speed of the motor will be increased, therefore, until the supporting member 121 is brought back to its position opposite the center of the supporting member 114. When the supporting member 121 has thus been restored to its original position, the light impinged on the photo-electric cell 125 will be reduced to its original intensity and as a result the current supplied to the solenoid 153 likewise will be reduced to its original value. It will be obvious, therefore, that the core 161 will move the brush 165 so as to be positioned over the center of the resistance 166.

If the shaft 112 should overrun the shaft 110, the supporting member 121 will take up a position such that the photo-electric cell 125 will be opposite a denser or more opaque portion of the glass in the opening 116. This movement of the shaft 112, therefore, will cause the light received by the photo-electric cell to be reduced and as a result the current supplied to the solenoid 153 will be reduced. It will be understood, therefore, that the spring 162 will pull the core 161 upwardly, as viewed in Fig. 7, so as to effect an increase in the resistance 166, which increase in resistance, of course, will effect a decrease in the motor speed so as to bring the shaft 112 back into synchronism with the shaft 110.

In the modified form of my invention shown in Fig. 10, I have dispensed with the solenoid 153 of Fig. 7. Otherwise, the structure of the modification is substantially the same as that of the modification shown in Figs. 7, 8 and 9. Thus, in the modified form of the invention (Fig. 10), the motor, the shafts and the light responsive means together with the light source will be identical in construction with the corresponding parts of the modification shown in Figs. 7, 8 and 9. Moreover, the amplifier 190 and the power tube 191 will be constructed in the same manner as the amplifier 143 and the power tube 147, respectively, of Fig. 7. As shown in Fig. 10, the output of the tube 191, however, is connected electrically to the motor field winding by means of conductors 192 and 193. As shown, a high voltage battery 194 is connected in the conductor 193. It will be understood, of course, that the motor 113 will be provided with a field winding suitably wound to accommodate this high voltage. One armature terminal, i. e., the terminal 177 is connected by means of a conductor 195 to an adjustable arm 196, which is provided for the adjustable resistance 197. This resistance is electrically connected by means of a conductor 198 to a battery 199, which corresponds with the battery 172 of Fig. 7.

In this modified form of the invention it will be understood that the shaded glass in the opening of the supporting member 114 will be reversed so that the transparent portion is toward the left, as viewed in Fig. 9, while the opaque portion will be toward the right.

In the operation of this modified form of the invention when the shaft 112 lags behind the shaft 110, less light will be received by the photo-electric cell 125, which as has already been described will cause a decrease of the current control by the plate of the tube 191. As a result of this action, it will be obvious that the current supplied to the motor field will be decreased. This, as is well understood, will cause the motor to speed up so as to again bring the two shafts into synchronism. If the shaft 112 should run faster than the shaft 110, more light will be received by the photo-electric cell 125 whereby the current in the motor field circuit will be increased. This increase of the field current will cause the motor to slow down until the shafts are again brought into synchronism.

It will be obvious that with either modification disclosed in Figs. 7, 8 and 9, or in Fig. 10, as with the modifications previously described, the rate of restoration of the shafts to synchronism will be proportional to the magnitude of the angular displacement between the shafts.

What I claim as new and desire to secure by Letters Patent of the United States, is:

1. The combination with a plurality of members, means for maintaining said members in synchronism comprising means for regulating the relative speed of said members including a plurality of light sensitive devices arranged to effect respectively adjustments of varying magnitudes in said relative speed and means for activating said light sensitive devices selectively in accordance with the relative speed of said members so that when said members depart from synchronism the relative speed of said members is regulated so that said members are restored to synchronism at a rate substantially proportional to the magnitude of the angular displacement between them.

2. The combination with a plurality of rotatable members of means for regulating the relative speed of said members comprising speed regulating means for one of said members, a plurality of light sensitive devices, a plurality of controlling devices for said speed regulating means responsive respectively to the activation of said light-sensitive devices so that when said devices are successively activated a graduated speed regulation for said one member is effected, and means for activating said light sensitive devices selectively in accordance with the relative speed of said members so that when said members depart from synchronism said speed regulating means is controlled to regulate the speed of said one member to restore said members to synchronism at a rate substantially proportional to the magnitude of the angular displacement between them.

3. The combination with a plurality of rotatable members of means for maintaining said rotatable members in synchronism comprising a light-sensitive device and a source of light therefor, said light-sensitive device and said light source being operably associated with said members so that each is moved in synchronism with one of said members, and means controlled by said light-responsive device for controlling the speed of one of said members.

4. The combination with a plurality of rotatable members and means for maintaining said rotatable members in synchronism comprising speed regulating means for one of said members, a plurality of light sensitive devices driven at a speed bearing a substantially constant ratio with the speed of one of said members, means connecting said light sensitive devices with said speed regulating means so that the latter is controlled to effect a graduated change in the speed of said one member in accordance with the activation of said light sensitive devices, a source of light driven at a speed bearing a substantially constant ratio with the speed of the other of said members and arranged to successively activate said light sensitive devices in accordance with the angular displacement of said members from synchronism so that said members are restored to synchronism at a rate substantially proportional to the magnitude of the angular displacement between them.

5. The combination with a plurality of rotatable members of means for maintaining said rotatable members in synchronism comprising light-sensitive means connected to be moved in synchronism with one of said rotatable members, a source of light for activating said light-sensitive means and speed controlling means for one of said members controlled by said light sensitive means.

6. The combination with a pair of rotatable members of means for maintaining said rotatable members in synchronism comprising a motor for rotating one of said members, light sensitive means connected to be moved in synchronism with one of said rotatable members, a source of light for activating said light sensitive means connected to be moved in synchronism with the other of said rotatable members and means controlled by said light sensitive means for controlling the speed of said motor.

7. The combination with a pair of rotatable members of means for maintaining said rotatable members in synchronism comprising motive means for rotating one of said members, a plurality of light sensitive cells connected to be rotated in synchronism with one of said members, a source of light for activating said light sensitive cells connected to be rotated in synchronism with the other of said members and means controlled by said light sensitive cells for controlling the speed of said motive means in accordance with the activation of said cells.

8. In combination, a pair of rotatable members, electro-responsive means for regulating the speed of the first of said members, a plurality of light responsive members connected to control said electroresponsive means so that said members when successively activated effect a graduated change in the speed of said first member and means for activating said light responsive members selectively in accordance with a departure of said members from synchronism so that said electro-responsive means is controlled to regulate the speed of said first member to restore said members to synchronism at a rate substantially proportional to the magnitude of said departure.

9. In combination, a pair of rotatable members, an electric motor for rotating one of said members, means for controlling the speed of said motor, light-responsive means comprising a plurality of photo-electric cells connected to control said speed controlling means so that said cells when selectively activated effect preselected motor speeds of varying magnitudes and means operably associating said light-responsive means with said rotatable members so that when said members depart from synchronism said photoelectric cells are selectively activated in accordance with the magnitude of the departure at a rate proportional to the magnitude of the angular displacement between said members.

10. The combination with a pair of rotatable members of an electric motor for controlling the speed of the first of said members and means for controlling said electric motor so that said first member is caused to rotate in synchronism with the second of said members comprising electro-responsive speed regulating means for said electric motor, a plurality of light sensitive cells connected to control said speed regulating means, said light sensitive cells being connected to rotate in synchronism with said second member and a source of light for activating said light sensitive cells connected to be rotated in synchronism with said first member.

11. The combination with a pair of rotatable members, of an electric motor for actuating the first of said members, a plurality of resistances of varying degree connected to control the speed of said electric motor, a plurality of photo-electric cells connected so that each photo-electric cell controls one of said resistances, means for supporting said photo-electric cells so that they are positioned substantially in the arc of a circle, said supporting means being operably associated with the second of said members so as to be rotated in synchronism therewith, a source of light for activating said photo-electric cells and means for rotating said source of light in synchronism with said first member whereby in the event said rotatable members depart from a synchronous condition said motor is controlled to restore said synchronous condition.

12. The combination with a plurality of rotatable members of means for maintaining said members in synchronism comprising means for regulating the speed of one of said members, a source of light driven at speed bearing a substantially constant ratio with the speed of one of said members, a plurality of light sensitive devices arranged so that they can be selectively activated by said source of light and driven at a speed bearing a substantially constant ratio with the speed of the other of said members, means connecting said light sensitive devices with said speed regulating means so that when said devices are successively activated said speed regulating means is controlled to effect a graduated change in the speed of said one member, one of said light sensitive devices corresponding to the position of angular agreement between said members and the remaining devices corresponding respectively to positions of angular disagreement between the members.

13. The combination with a plurality of rotatable members of means for maintaining said members in synchronism comprising means for regulating the relative speed of said members, a plurality of light sensitive cells, means for activating said cells selectively in accordance with the relative position of said members and means responsive to the selective activation of said cells controlling said speed regulating means so that when said members depart from synchronism said speed regulating means is controlled to restore said members to synchronism at a rate substantially proportional to the magnitude of the angular displacement between them.

In witness whereof, I have hereunto set my hand this 20th day of May, 1929.

JOHN HAYS HAMMOND, Jr.